(12) United States Patent
Nishida et al.

(10) Patent No.: US 11,811,997 B2
(45) Date of Patent: Nov. 7, 2023

(54) READING APPARATUS SWITCHING BETWEEN FIRST OPTICAL PATH AND SECOND OPTICAL PATH

(71) Applicant: FUJIFILM Business Innovation Corp., Tokyo (JP)

(72) Inventors: Yoji Nishida, Kanagawa (JP); Masato Serikawa, Kanagawa (JP); Emiko Shiraishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/745,815

(22) Filed: May 16, 2022

(65) Prior Publication Data
US 2023/0179726 A1  Jun. 8, 2023

(30) Foreign Application Priority Data

Dec. 8, 2021 (JP) .................................. 2021-198935

(51) Int. Cl.
*H04N 1/04* (2006.01)
*H04N 1/028* (2006.01)
*G03G 15/22* (2006.01)

(52) U.S. Cl.
CPC ......... *H04N 1/02835* (2013.01); *G03G 15/22* (2013.01); *H04N 1/0284* (2013.01); *H04N 1/02825* (2013.01)

(58) Field of Classification Search
None
See application file for complete search history.

(56) References Cited

U.S. PATENT DOCUMENTS

| 2002/0040971 | A1* | 4/2002 | Ono | G01S 17/08 |
| | | | | 250/559.38 |
| 2006/0210295 | A1* | 9/2006 | Nakaya | G03G 15/5062 |
| | | | | 399/75 |
| 2007/0091465 | A1* | 4/2007 | Ichikawa | G02B 26/10 |
| | | | | 359/726 |
| 2021/0270600 | A1* | 9/2021 | Yoshioka | G01S 17/46 |
| 2021/0306507 | A1* | 9/2021 | Watanabe | G02B 7/1821 |
| 2021/0368058 | A1* | 11/2021 | Nishida | H04N 1/0284 |

FOREIGN PATENT DOCUMENTS

| JP | 2007116536 | 5/2007 |
| JP | 2010130444 | 6/2010 |

* cited by examiner

*Primary Examiner* — Dung D Tran
(74) *Attorney, Agent, or Firm* — JCIPRNET (57) ABSTRACT

A reading apparatus includes an light emitter that performs irradiation with light, a light receiver that receives light reflected from an object to be imaged, a first optical path in which specularly reflected light is guided to the light receiver as a read image, a second optical path in which diffusely reflected light is guided to the light receiver as a read image, and a switching section that switches between the first optical path and the second optical path by rotating the light emitter.

20 Claims, 5 Drawing Sheets

READING APPARATUS SWITCHING BETWEEN FIRST OPTICAL PATH AND SECOND OPTICAL PATH

CROSS-REFERENCE TO RELATED APPLICATIONS

This application is based on and claims priority under 35 USC 119 from Japanese Patent Application No. 2021-198935 filed Dec. 8, 2021.

BACKGROUND (i) Technical Field

The present invention relates to a reading apparatus.

(ii) Related Art

There is known a reading apparatus including a transparent plate-shaped member that supports a document, a first irradiation section that performs irradiation with light from a plate-shaped member side in order to read diffusely reflected light from the document supported by the plate-shaped member, a light guiding section that guides the diffusely reflected light, which is light emitted by the first irradiation section, to a determined position, a generation section that generates a signal according to light received at the determined position, and a second irradiation section that performs irradiation with light from the plate-shaped member side in order to read a part of a specularly reflected light component from the document supported by the plate-shaped member and performs irradiation with light such that a part of the specularly reflected light component is guided by the light guiding section and a signal is generated by the generation section at the determined position, in which an angle of incidence of light emitted by the second irradiation section to the document is an inclination that is not 0 degree with respect to a reflection angle of main rays of the specularly reflected light guided by the light guiding section (JP2010-130444A).

There is also known an image reading apparatus including a light source that is provided at a position of performing irradiation with light in a direction of an object to be imaged, a first optical member that has a reflection surface reflecting light and an absorbing surface absorbing light, a second optical member that makes light incident from the light source into parallel light and emits the parallel light, signal generation means that receives reflected light from the object to be imaged irradiated with light by the light source and generates and outputs an image signal based on the reflected light, switching means that switches an image reading mode of the image reading apparatus to any one of a first image reading mode, in which the object to be imaged is irradiated with light emitted from the light source from at least two directions and an image signal indicating an image of the object to be imaged is generated based on diffusely reflected light from the object to be imaged, and a second image reading mode, in which the object to be imaged is irradiated with light emitted from the light source from a certain direction and an image signal indicating an image of the object to be imaged based on specularly reflected light from the object to be imaged is generated, a first optical system member that guides the diffusely reflected light from the object to be imaged to the signal generation means in the first image reading mode, a second optical system member that guides the specularly reflected light from the object to be imaged to the signal generation means in the second image reading mode, first drive means that arranges the second optical member at a position where light emitted from the light source is made into parallel light and the parallel light is emitted to the object to be imaged in the second image reading mode but does not arrange the second optical member at a position where light emitted from the light source is made into parallel light and the parallel light is emitted to the object to be imaged in the first image reading mode, and second drive means that is drive means, which changes a position or a posture of the first optical member, that changes the position or the posture of the first optical member into a position or a posture, in which light emitted from the light source is reflected from the reflection surface in a direction toward the object to be imaged and diffusely reflected light from the object to be imaged is guided to the signal generation means by the first optical system member, in the first image reading mode, and that changes the position or the posture of the first optical member into a position or a posture, in which light emitted from the light source is diffusely reflected from the object to be imaged and heads for a non-reflection surface and specularly reflected light from the object to be imaged is guided to the signal generation means by the second optical system member, in the second image reading mode (JP2007-116536A).

SUMMARY

Aspects of non-limiting embodiments of the present disclosure relate to a reading apparatus that performs irradiation with light emitted from one light source and obtains specularly reflected light and diffusely reflected light, which are from object to be imaged, as read images.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a reading apparatus including an irradiation unit that performs irradiation with light, a light receiving unit that receives light reflected from an object to be imaged, a first optical path in which specularly reflected light, which is obtained as light emitted by the irradiation unit is reflected from a first reflection surface so that a front surface of the object to be imaged in an irradiation region is irradiated with the reflected light, and the reflected light is specularly reflected from the front surface of the object to be imaged, is guided to the light receiving unit as a read image, a second optical path in which diffusely reflected light, which is obtained as the light emitted by the irradiation unit is reflected from a second reflection surface so that the front surface of the object to be imaged in the irradiation region is irradiated with the reflected light, and the reflected light is diffusely reflected from the front surface of the object to be imaged, is guided to the light receiving unit as a read image, and a switching section that switches between the first optical path and the second optical path by rotating the irradiation unit.

BRIEF DESCRIPTION OF THE DRAWINGS

Exemplary embodiment(s) of the present invention will be described in detail based on the following figures, wherein.

DETAILED DESCRIPTION

Next, the present invention will be described in more detail with reference to the drawings by giving an exemplary embodiment and a specific example below, but the present invention is not limited to the exemplary embodiment and the specific example.

In addition, in the description using the drawings below, it is to be noted that the drawings are schematic, the ratio of each dimension is different from the actual ratio, and members that are not necessary for the description to facilitate understanding will not be shown as appropriate.

(1) Overall Configuration and Operation of Image Forming Apparatus

Figure 1:
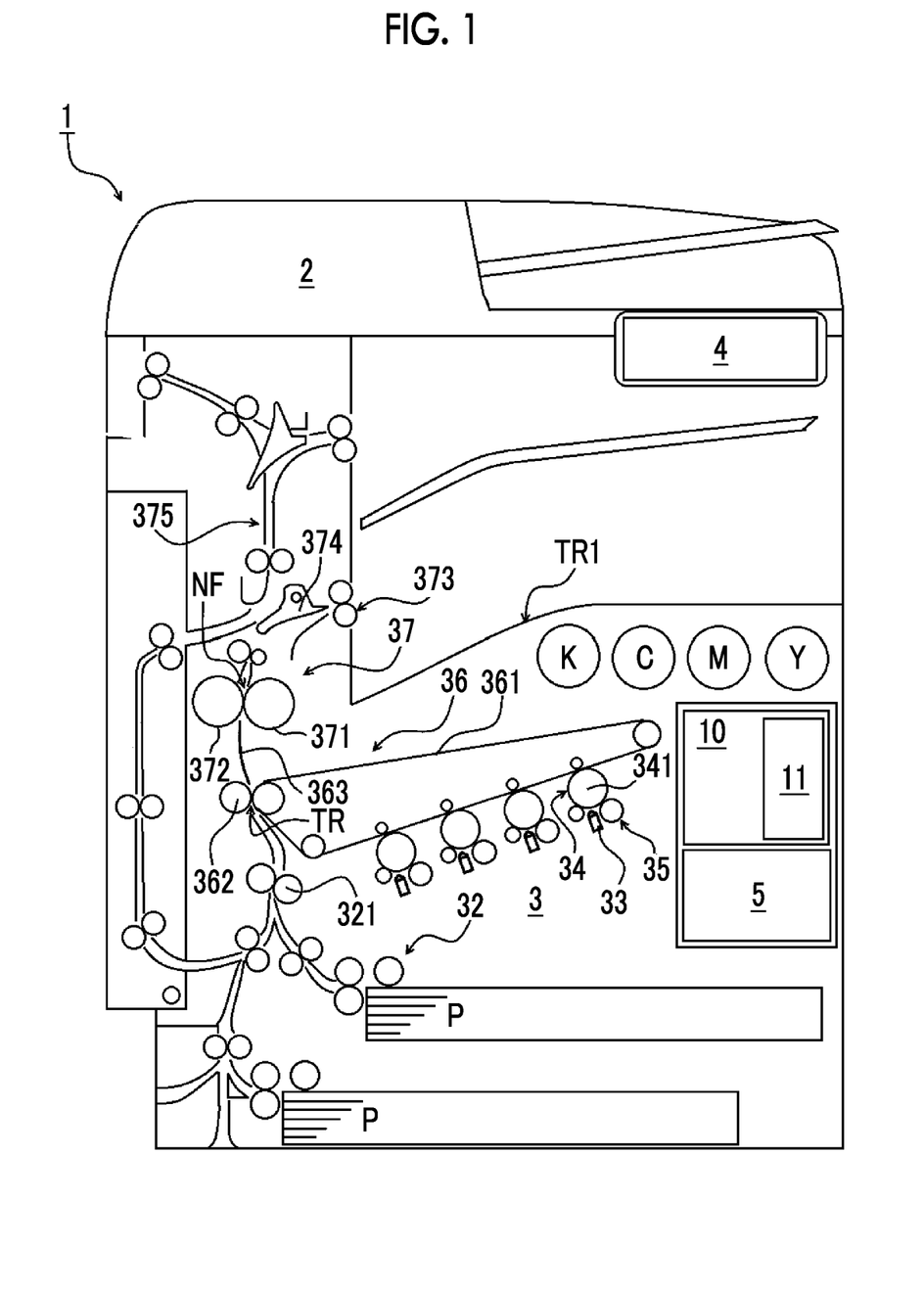
FIG. 1 is a schematic cross-sectional view showing an internal configuration of an image forming apparatus including a reading apparatus.
Figure 2:
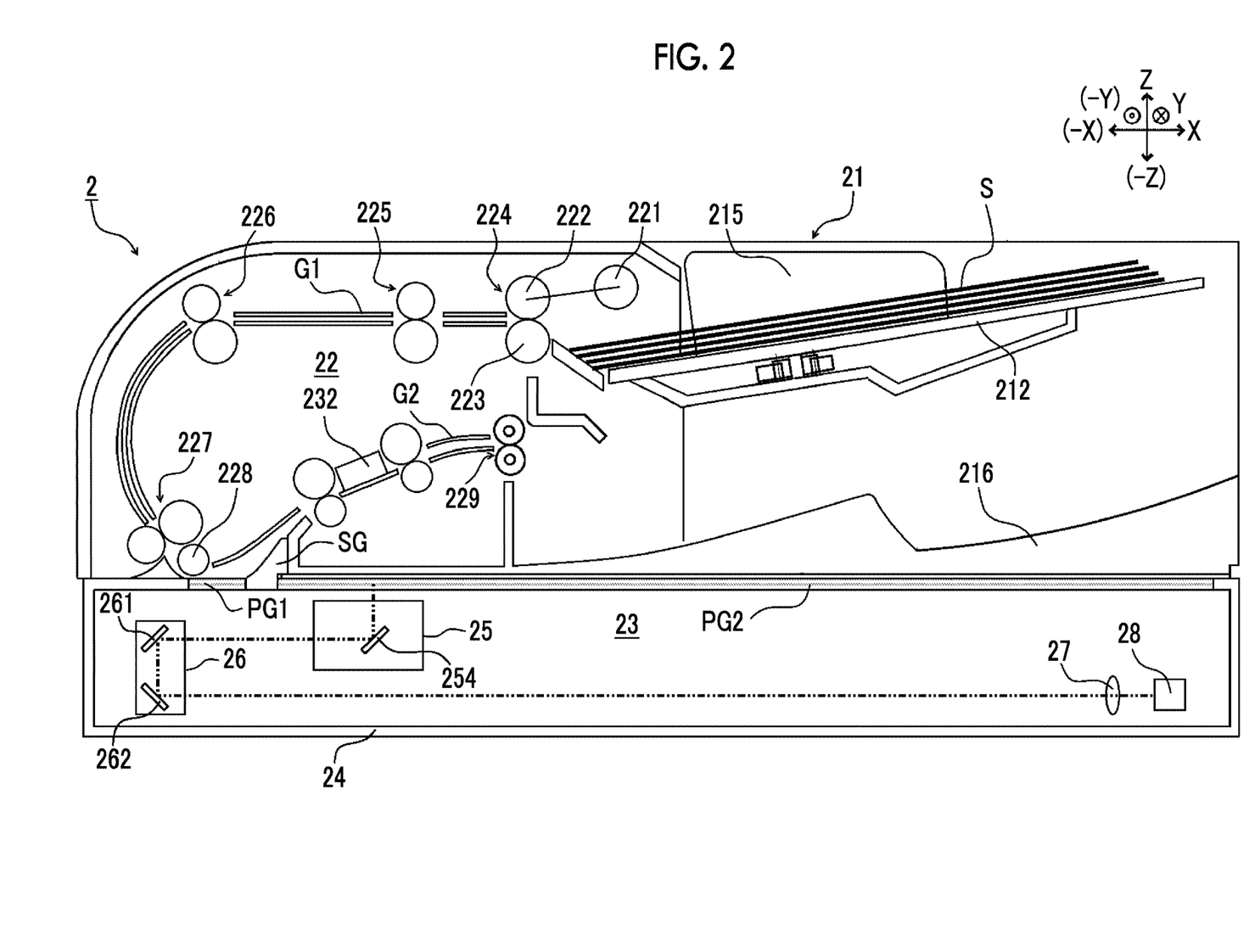
FIG. 2 is a cross-sectional configuration view showing an internal configuration of the reading apparatus.

FIG. 1 is a schematic cross-sectional view showing an internal configuration of an image forming apparatus 1 including a reading apparatus 2 according to the present exemplary embodiment. FIG. 2 is a cross-sectional configuration view showing an internal configuration of the reading apparatus 2. Hereinafter, the overall configuration and operations of the image forming apparatus 1 will be described with reference to the drawings.

(1.1) Overall Configuration

The image forming apparatus 1 is configured to include the reading apparatus 2 that reads an image from a sheet S such as a document and converts the image into image data, an image forming unit 3 that is image recording means which prints the read image data on paper, which is a recording medium, an operation information unit 4 that is a user interface, and an image processing unit 5.

The reading apparatus 2 is configured to include a sheet stacked portion 21, an automatic sheet sending unit 22, and an image reading unit 23. The automatic sheet sending unit 22 transports the sheet S placed on the sheet stacked portion 21 to a reading position of the image reading unit 23, and an image read by an image sensor 28, such as a charge coupled device (CCD) line sensor of the image reading unit 23, is converted into image data which is an electrical signal. In addition, an image on the sheet S placed on platen glass PG2 (see PG2 in FIG. 2), that is, the entire sheet S is read while a carriage 25 is sequentially moved in a sub-scanning direction X.

The image forming unit 3 is configured to include a paper feeding device 32, an exposure device 33, a photoconductor unit 34, a developing device 35, a transfer device 36, and a fixing device 37 and forms image information received from the image processing unit 5 on paper P sent from the paper feeding device 32 as a toner image.

The operation information unit 4, which is a user interface, is arranged on the front side of the reading apparatus 2. The operation information unit 4 is configured by combining a liquid crystal display panel, various types of operation buttons, and a touch panel, and a user of the image forming apparatus 1 performs various types of inputs of setting and instruction via the operation information unit 4. In addition, various types of information are displayed for the user of the image forming apparatus 1 via the liquid crystal display panel.

The image processing unit 5 generates image data from an image read by the reading apparatus 2 and printing information transmitted from an external device (for example, a personal computer).

(1.2) Image Forming Unit

In the image forming unit 3, the paper P designated for each sheet of printing in a print job from the paper feeding device 32 is sent to the image forming unit 3 at an image forming timing.

The photoconductor unit 34 includes photoconductor drums 341 that are each provided above the paper feeding device 32 in parallel and are rotationally driven. Yellow (Y), magenta (M), cyan (C), and black (K) toner images are formed on the photoconductor drums 341 respectively, on which electrostatic latent images are formed by the exposure devices 33, by the respective developing devices 35.

Each color toner image formed on the photoconductor drum 341 of each photoconductor unit 34 is sequentially electrostatically transferred (primarily transferred) on an intermediate transfer belt 361 of the transfer device 36, and a superimposed toner image on which each color toner is superimposed is formed. The superimposed toner image on the intermediate transfer belt 361 is sent out from a pair of resist rollers 321 and is collectively transferred on the paper P guided by a transport guide by a secondary transfer roller 362.

In the fixing device 37, a fixing nip FN (fixing region) is formed by a pressure contact region between a pair of a heating module 371 and a pressurizing module 372.

The paper P on which the toner image is collectively transferred by the transfer device 36 is transported to the fixing nip FN of the fixing device 37 via a transport guide 363 in a state where the toner image is not fixed, and the toner image is fixed by the pair of the heating module 371 and the pressurizing module 372 by action of heating and crimping.

The paper P on which the fixed toner image is formed is guided by a switching gate 374 and is discharged and accommodated in a discharged paper tray portion TR1 on an upper surface of the image forming apparatus 1 from a pair of first discharge rollers 373. In addition, in a case where the paper P is inverted for two-sided printing or is discharged with an image recording surface facing upward, a transport direction is switched to a transport path 375 at the switching gate 374.

(1.3) Reading Apparatus

The sheet stacked portion 21 includes a sheet tray 212 on which the sheet S, which is an example of an object to be imaged and on which an image is recorded, is placed.

The automatic sheet sending unit 22 includes a nudger roller 221 that takes out the sheet S placed on the sheet tray 212 from the top in turn and a separating unit 224 that consists of a feed roller 222 and a retard roller 223.

In a case where the feed roller 222 and the retard roller 223 are paired and the sheets S overlapping each other are sent out to a nip portion N, the separating unit 224 separates (handles) the sheets S and transports one by one to the image reading unit 23.

In a sheet transport path G1, a takeaway roller 225 is arranged at a position on a downstream side of the feed roller 222 with respect to the transport direction of the sheet S. The takeaway roller 225 transports the sheet S sent out by the feed roller 222 to a pre-registration roller 226.

On the downstream side of the pre-registration roller 226, a registration roller 227 that adjusts a transport timing of the sheet S is arranged. The pre-registration roller 226 forms a loop in a state where a tip of the sheet S is abutted against the stopped registration roller 227 and corrects a skew. The registration roller 227 is rotationally driven at a reading start timing, the sheet S is pressed against reading glass PG1 by a platen roller 228 in a state where the loop is held by the takeaway roller 225 and the pre-registration roller 226, and a front surface is read by the image reading unit 23.

The sheet S which has passed through the reading glass PG1 is guided by a sheet guide SG and is transported to a reading sensor 232 that reads a back surface. The sheet S of which the front surface is read by the image reading unit 23 is transported in a sheet transport path G2 while the back surface is being read by the reading sensor 232, and is discharged to a discharged paper tray 216 formed below the sheet stacked portion 21 by a discharge roller 229.

The image reading unit 23 is provided with the platen glass PG2 on which the sheet S is placed is arranged on an upper surface of a housing 24 and is a so-called reduction optical system reading apparatus configured by arranging the carriage 25, a carriage 26, an image forming lens 27, and the image sensor 28, which are provided to be reciprocable in the sub-scanning direction (right-left direction: X-direction), inside the housing 24.

The image reading unit 23 has a width in a main scanning direction (depth direction: Y-direction) for the shown configurations. All of the carriage 25, the carriage 26, the image forming lens 27, and the image sensor 28 have an elongated shape having a main scanning direction Y as a longitudinal direction.

In a case of reading the sheet S, the carriage 25 moves in the sub-scanning direction X at a determined speed. The carriage 25 has an irradiation unit that irradiates the sheet S with light, and the irradiation unit will be described later with reference to FIG. 3. The carriage 25 has a mirror 254 and reflects light reflected from the sheet S. The reflected light is guided to an optical path B1 leading to the image sensor 28.

In a case of reading the sheet S, the carriage 26 moves in the sub-scanning direction X at half the speed of the carriage 25. The carriage 26 has a mirror 261 and a mirror 262. The mirrors 261 and 262 reflect light reflected from the mirror 254 and guide the reflected light to the optical path B1. The image forming lens 27 forms an image of light reflected from the mirror 262 at a determined position.

The image sensor 28 has a light receiving element such as a charge coupled device (CCD), receives the light of which the image has been formed by the image forming lens 27, and generates an analog image signal according to the received light.

In a case where the sheet S is placed on the platen glass PG2, by reading image information for each line while sequentially moving the carriage 25 in the sub-scanning direction X, reflected light from the sheet S is guided to the image sensor 28, and the image of the entire sheet S is read.

(2) Configurations and Operations of Major Portions of Image Reading Unit

Figure 3:
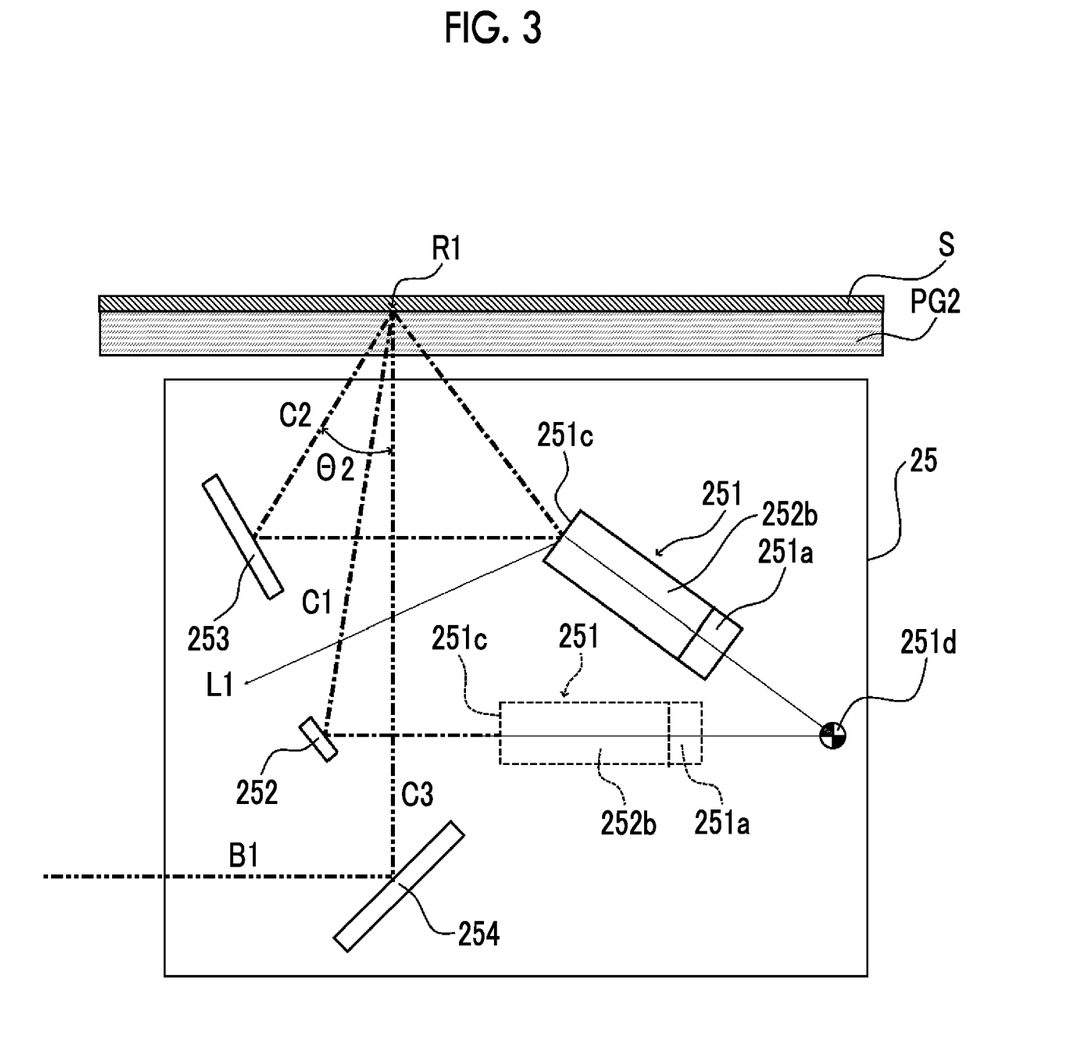
FIG. 3 is an enlarged schematic cross-sectional view showing an internal configuration of a carriage where a light emitting unit is positioned at a second position.
Figure 4:
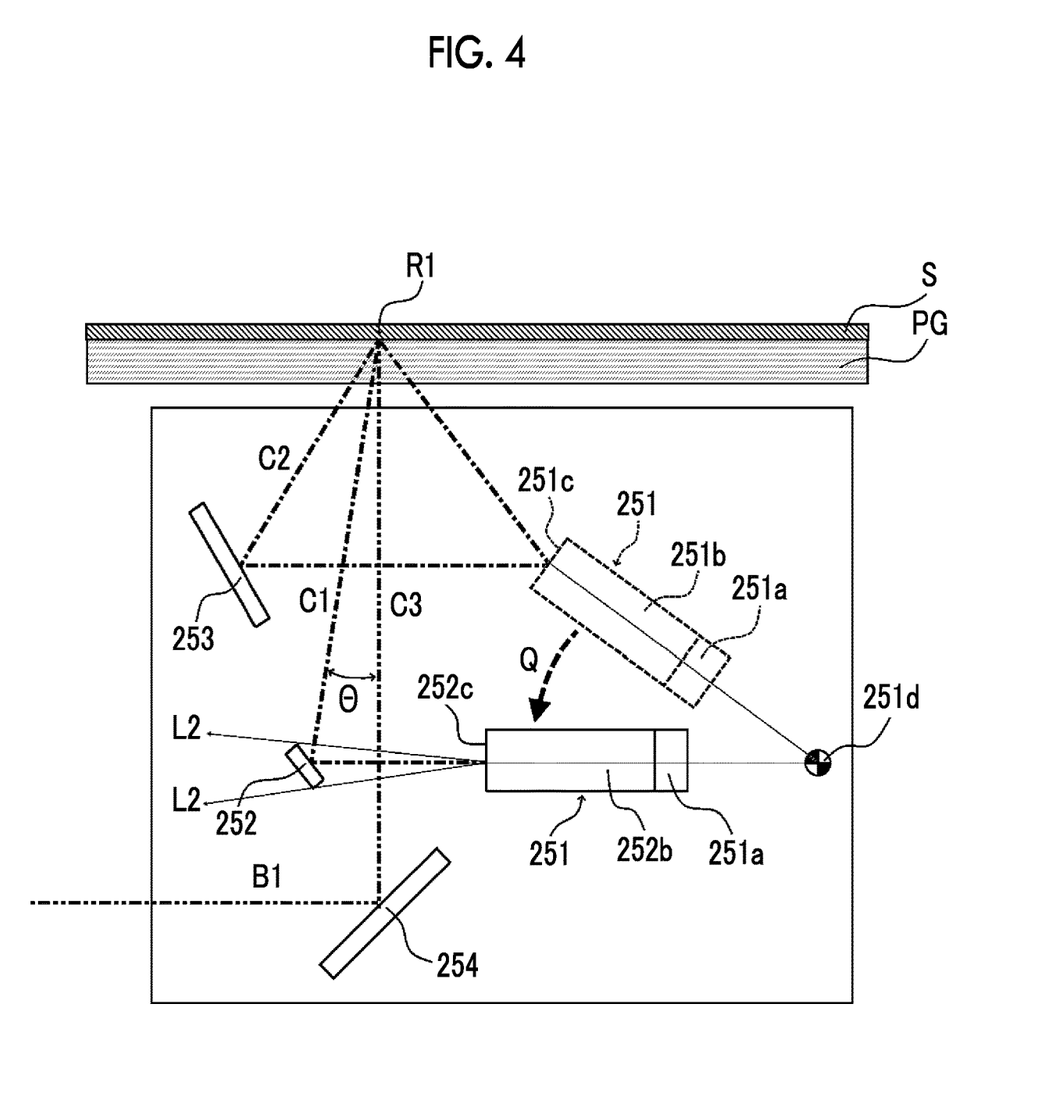
FIG. 4 is an enlarged schematic cross-sectional view showing an internal configuration of the carriage where the light emitting unit is positioned at a first position.
Figure 5:
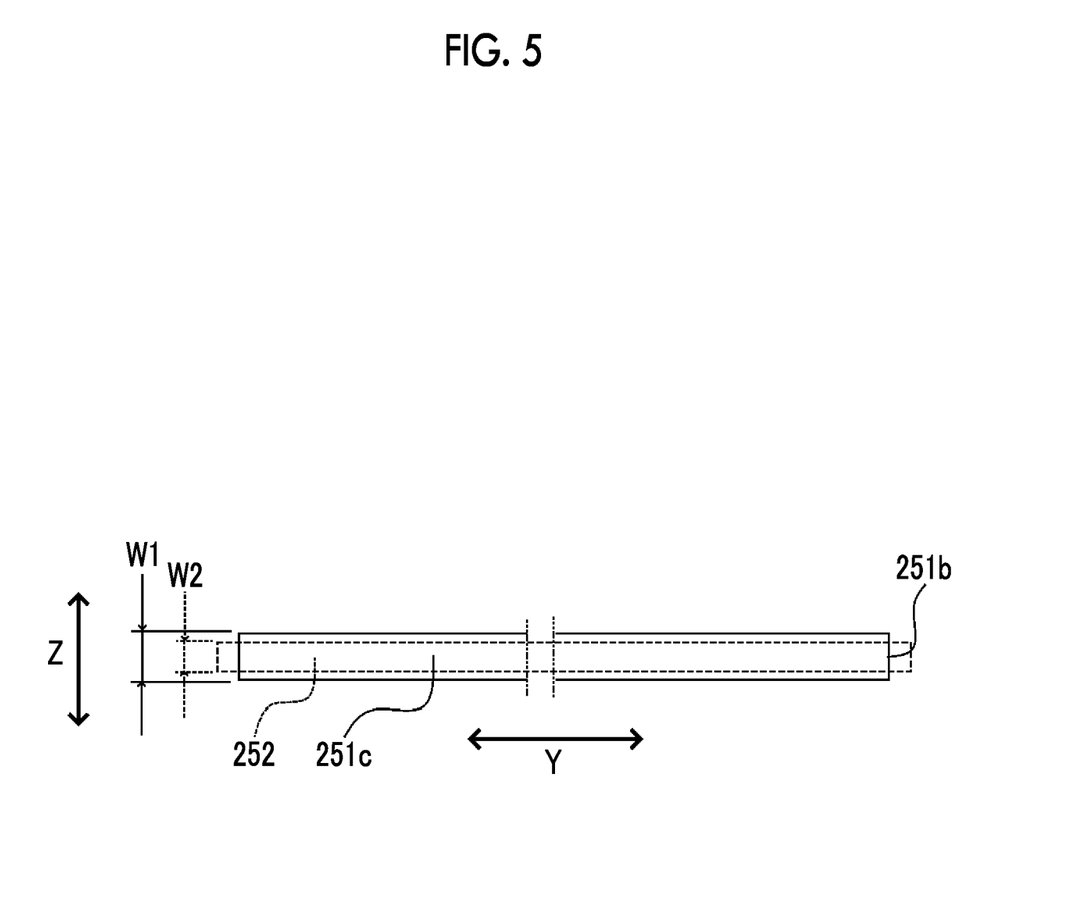
FIG. 5 is a view showing an emitting surface and a specular reflection reflector viewed from a light emitting direction.

FIG. 3 is an enlarged schematic cross-sectional view showing an internal configuration of the carriage 25 where a light emitting unit 251 is positioned at a second position. FIG. 4 is an enlarged schematic cross-sectional view showing an internal configuration of the carriage 25 where the light emitting unit 251 is positioned at a first position. FIG. 5 is a view showing an emitting surface 251c and a specular reflection reflector 252 viewed from a light emitting direction.

(2.1) Configuration of Carriage

The carriage 25 has the light emitting unit 251, which is an example of the irradiation unit emitting light, the specular reflection reflector 252, which is an example of a first reflection surface, a diffuse reflection reflector 253, which is an example of a second reflection surface, and the mirror 254, which is an example of a third reflection surface.

In the carriage 25, it is possible to switch between a first optical path C1 in which specularly reflected light, which is obtained as light emitted by the light emitting unit 251 is reflected from the specular reflection reflector 252 so that the front surface of the sheet S, which is an object to be imaged in an irradiation region R1, is irradiated with the reflected light, and the reflected light is specularly reflected from the front surface of the sheet S, is guided to the image sensor 28 as a read image and a second optical path C2 in which diffusely reflected light, which is obtained as light emitted by the light emitting unit 251 is reflected from the diffuse reflection reflector 253 so that the front surface of the sheet S in the irradiation region R1 is irradiated with the reflected light, and the reflected light is diffusely reflected from the front surface of the sheet S, is guided to the image sensor 28 as a read image.

The light emitting unit 251 has the emitting surface 251c and emits light from the emitting surface 251c. The light emitting unit 251 has a light source 251a and a light guide body 251b. The light source 251a is a light source that emits light, such as a light emitting diode (LED). The light guide body 251b is a transparent member that transmits light therein. The emitting surface 251c of the light guide body 251b is a flat surface in the present example, and the light from the light source 251a is guided to the emitting surface 251c.

The light emitting unit 251 has a rotation fulcrum 251d at an end portion of the light source 251a. As shown in FIGS. 3 and 4, the light emitting unit 251 is rotatable between the first position (shown in FIG. 4) where the emitting surface 251c faces the specular reflection reflector 252 and the second position (shown in FIG. 3) where a part of the emitting surface 251c faces the diffuse reflection reflector 253 as the light guide body 251b integrally rotates (indicated by an arrow Q in FIG. 4) about the rotation fulcrum 251d.

Specifically, an actuator (not shown), which is a switching section, switches from the first optical path C1 to the second optical path C2 by rotating (indicated by the arrow Q in FIG. 4) the light emitting unit 251 in a direction separating away from the irradiation region R1, that is, the front surface of the sheet S, which is an object to be imaged. Accordingly, specularly reflected light emitted from the light emitting unit 251 is far from the irradiation region R1, the specularly reflected light can be weakened, and a position change of a harness (not shown) that supplies power to the light source 251a can be decreased.

The mirror 254 is arranged vertically below the irradiation region R1, which is a reading region, as indicated by an optical path C3 in FIGS. 3 and 4. Light reflected from the sheet S, which is an object to be imaged, includes both of specularly reflected light and diffusely reflected light, is reflected from the mirror 254 as the common optical path C3, and is guided to the image sensor 28 via the carriage 26. Accordingly, compared to a case where optical paths of the specularly reflected light and the diffusely reflected light are different from each other, the reading apparatus 2 can be miniaturized.

Although the specular reflection reflector 252 and the diffuse reflection reflector 253, which is an example of a second reflection surface, are arranged such that reflected light from the sheet S is guided to the image sensor 28 through the optical path C3, which is a common optical path for the specularly reflected light and the diffusely reflected light, light irradiation timings are different from each other.

As shown in FIG. 4, the specular reflection reflector 252 is arranged close to the optical path C3 laterally in a horizontal direction of the light emitting unit 251 positioned at the first position such that at the irradiation region R1, an acute angle (indicated by Θ1 in FIG. 4) is formed with respect to the optical path C3 from the irradiation region R1 toward the mirror 254, that is, an angle made with the irradiation region R1 is close to being vertical.

Accordingly, the irradiation region R1 is irradiated with light emitted from the light emitting unit 251 positioned at the first position at the acute angle with respect to the optical path C3 at the specular reflection reflector 252, and the first optical path C1 is formed as specularly reflected light reflected from the sheet S along the optical path C3 toward the mirror 254.

As shown in FIG. 3, the diffuse reflection reflector 253 is arranged to be spaced apart from the optical path C3 compared to the specular reflection reflector 252 laterally in the horizontal direction of the light emitting unit 251 positioned at the second position such that at the irradiation region R1, an obtuse angle (indicated by Θ2 in FIG. 3) is formed with respect to the optical path C3 from the irradiation region R1 toward the mirror 254.

Accordingly, the irradiation region R1 is directly irradiated with some of light emitted from the light emitting unit 251 positioned at the second position, the irradiation region R1 is irradiated with some of the light at the obtuse angle with respect to the optical path C3 at the diffuse reflection reflector 253, and the second optical path C2 is formed as diffusely reflected light reflected from the sheet S along the optical path C3 toward the mirror 254.

To further describe arrangement positions of the specular reflection reflector 252 and the diffuse reflection reflector 253 relative to each other in the carriage 25, the specular reflection reflector 252 is arranged at a position which is closer to the mirror 254 than the diffuse reflection reflector 253 is and to which light emitted from the light emitting unit 251 positioned at the second position is not incident (indicated by a thin line L1 in FIG. 3). Accordingly, diffusely reflected light emitted from the light emitting unit 251 positioned at the second position is not superimposed on specularly reflected light.

The carriage 25 has an elongated shape having the main scanning direction Y as a longitudinal direction. The light source 251a and the light guide body 251b, which are arranged in the carriage 25, are members of which longitudinal directions are the main scanning direction Y, and the emitting surface 251c is also a surface having the main scanning direction Y as a longitudinal direction as shown in FIG. 5.

Herein, in a case where a direction that is orthogonal to the main scanning direction Y and the longitudinal directions and is along the emitting surface 251c is defined as a transverse direction Z, as shown in FIG. 5, a dimension of the emitting surface 251c in the transverse direction Z is W1, and the specular reflection reflector 252 (indicated by a broken line in FIG. 5) has a dimension in the transverse direction Z that is W2 and has a size smaller than the emitting surface 251c of the light emitting unit 251.

As described above, by making the dimension in the transverse direction Z small, compared to a case where the size of the specular reflection reflector 252 is larger than the size of the emitting surface 251c, the irradiation region R1 can be irradiated with only light (indicated by a thin line L2 in FIG. 4) for obtaining a necessary specularly reflected image, and a specularly reflected image that is small in size can be obtained.

(2.2) Reading Operation

First, the image reading unit 23 reads the sheet S by turning on the light emitting unit 251 positioned at the second position and moving the carriage 25 and the carriage 26 to an end portion of the sheet S in the sub-scanning direction and generates image data indicating an image of diffusely reflected light of the sheet S.

Next, in a case of returning the carriage 25 and the carriage 26 to original positions from the end portion in the sub-scanning direction X, the light emitting unit 251 is turned on in a rotated state so as to be positioned at the first position, the sheet S is read, and image data indicating an image of specularly reflected light of the sheet S is generated.

As described above, in the present exemplary embodiment, by rotating one light emitting unit 251, one sheet S, which is an object to be imaged, is read by being separated into an image shown by specularly reflected light and an image shown by diffusely reflected light.

Then, for example, processing of obtaining one image, in which glossiness is reproduced, is performed using image data indicating the two generated images. Also the texture and roughness of an object to be imaged, which is displayed in an image by reproducing glossiness, are reproduced, and an image in which not only glossiness but also texture in a broad sense is reproduced is generated.

In the reading apparatus 2 of the present exemplary embodiment, as the first optical path C1 in which specularly reflected light, which is obtained as light emitted by the light emitting unit 251 is reflected from the specular reflection reflector 252 so that the front surface of the sheet S, which is an object to be imaged in the irradiation region R1, is irradiated with the reflected light, and the reflected light is specularly reflected from the front surface of the sheet S, is guided to the image sensor 28 as a read image and the second optical path C2 in which diffusely reflected light, which is obtained as light emitted by the light emitting unit 251 is reflected from the diffuse reflection reflector 253 so that the front surface of the sheet S in the irradiation region R1 is irradiated with the reflected light, and the reflected light is diffusely reflected from the front surface of the sheet S, is guided to the image sensor 28 as a read image are switched between by rotating the light emitting unit 251 in the direction separating away from the irradiation region R1, it is possible to perform irradiation with light emitted from one light source and to obtain specularly reflected light and diffusely reflected light from the sheet S, which is an object to be imaged, as read images.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use

What is claimed is:

1. A reading apparatus comprising:
an light emitter that performs irradiation with light;
a light receiver that receives light reflected from an object to be imaged;
a first optical path in which specularly reflected light, which is obtained as light emitted by the light emitter is reflected from a first reflection surface so that a front surface of the object to be imaged in an irradiation region is irradiated with the reflected light, and the reflected light is specularly reflected from the front surface of the object to be imaged, is guided to the light receiver as a read image;
a second optical path in which diffusely reflected light, which is obtained as the light emitted by the light emitter is reflected from a second reflection surface so that the front surface of the object to be imaged in the irradiation region is irradiated with the reflected light, and the reflected light is diffusely reflected from the front surface of the object to be imaged, is guided to the light receiver as a read image; and
a switching section that switches between the first optical path and the second optical path by rotating the light emitter,
wherein a part of the first optical path and the second optical path is reflected by a common mirror.

2. The reading apparatus according to claim 1,
wherein the switching section switches from the second optical path to the first optical path by rotating the light emitter in a direction separating away from the irradiation region.

3. The reading apparatus according to claim 2,
wherein the first optical path and the second optical path have a common optical path, which has a third reflection surface and in which the specularly reflected light and the diffusely reflected light, which are reflected from the object to be imaged, are guided to the light receiver.

4. The reading apparatus according to claim 3,
wherein the first reflection surface is arranged at a position, which is closer to the third reflection surface than the second reflection surface is and to which light emitted by the light emitter in the second optical path is not incident.

5. The reading apparatus according to claim 2,
wherein the light emitter includes a light source that emits light and a light guide body that has a flat emitting surface and guides light from the light source to the emitting surface, and the light source and the light guide body integrally rotate with a light source side as a rotation fulcrum.

6. The reading apparatus according to claim 5,
wherein the first optical path and the second optical path have a common optical path, which has a third reflection surface and in which the specularly reflected light and the diffusely reflected light, which are reflected from the object to be imaged, are guided to the light receiver.

7. The reading apparatus according to claim 6,
wherein the first reflection surface is arranged at a position, which is closer to the third reflection surface than the second reflection surface is and to which light emitted by the light emitter in the second optical path is not incident.

8. The reading apparatus according to claim 5,
wherein an angle formed between light emitted by the light emitter in the second optical path and the irradiation region is closer to being vertical than light emitted by the light emitter in the first optical path, and an incident angle of light, which is reflected from the first reflection surface and with which the object to be imaged is irradiated, is closer to being vertical than an incident angle of light, which is reflected from the second reflection surface and with which the object to be imaged is irradiated.

9. The reading apparatus according to claim 2,
wherein an angle formed between light emitted by the light emitter in the second optical path and the irradiation region is closer to being vertical than light emitted by the light emitter in the first optical path, and an incident angle of light, which is reflected from the first reflection surface and with which the object to be imaged is irradiated, is closer to being vertical than an incident angle of light, which is reflected from the second reflection surface and with which the object to be imaged is irradiated.

10. The reading apparatus according to claim 1,
wherein the light emitter includes a light source that emits light and a light guide body that has a flat emitting surface and guides light from the light source to the emitting surface, and the light source and the light guide body integrally rotate with a light source side as a rotation fulcrum.

11. The reading apparatus according to claim 10,
wherein the first optical path and the second optical path have a common optical path, which has a third reflection surface and in which the specularly reflected light and the diffusely reflected light, which are reflected from the object to be imaged, are guided to the light receiver.

12. The reading apparatus according to claim 11,
wherein the first reflection surface is arranged at a position, which is closer to the third reflection surface than the second reflection surface is and to which light emitted by the light emitter in the second optical path is not incident.

13. The reading apparatus according to claim 10,
wherein an angle formed between light emitted by the light emitter in the second optical path and the irradiation region is closer to being vertical than light emitted by the light emitter in the first optical path, and an incident angle of light, which is reflected from the first reflection surface and with which the object to be imaged is irradiated, is closer to being vertical than an incident angle of light, which is reflected from the second reflection surface and with which the object to be imaged is irradiated.

14. The reading apparatus according to claim 10,
wherein the first reflection surface has a smaller size than the emitting surface of the light emitter in a transverse direction orthogonal to a main scanning direction.

15. The reading apparatus according to claim 1,
wherein the first optical path and the second optical path have a common optical path, which has a third reflection surface and in which the specularly reflected light and the diffusely reflected light, which are reflected from the object to be imaged, are guided to the light receiver.

16. The reading apparatus according to claim 15,
wherein the first reflection surface is arranged at a position, which is closer to the third reflection surface than the second reflection surface is and to which light emitted by the light emitter in the second optical path is not incident.

17. The reading apparatus according to claim 1, wherein an angle formed between light emitted by the light emitter in the second optical path and the irradiation region is closer to being vertical than light emitted by the light emitter in the first optical path, and an incident angle of light, which is reflected from the first reflection surface and with which the object to be imaged is irradiated, is closer to being vertical than an incident angle of light, which is reflected from the second reflection surface and with which the object to be imaged is irradiated.

18. The reading apparatus according to claim 1, wherein each of the first reflection surface and the second reflection surface has a shape having a main scanning direction as a longitudinal direction, and the first reflection surface has a smaller dimension than the second reflection surface in a transverse direction.

19. An output device that outputs a specular reflection degree based on specularly reflected light read by the reading apparatus according to claim 1.

20. An image forming apparatus comprising:
the output device according to claim 19,
wherein the image forming apparatus outputs an image formed based on the specular reflection degree read by the reading apparatus.

* * * * *